Aug. 6, 1963 H. CRESCENT 3,100,125
SAFETY LOCK MECHANISM, NOTABLY FOR CONVERTIBLE SEATS
Filed March 14, 1961 2 Sheets-Sheet 1
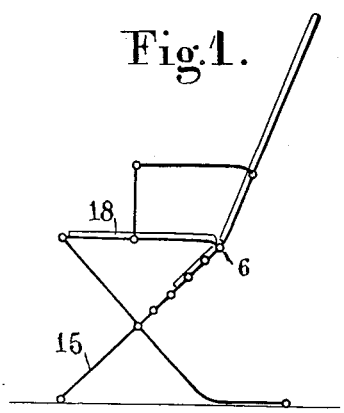
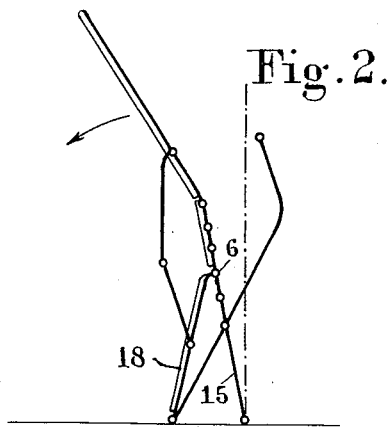
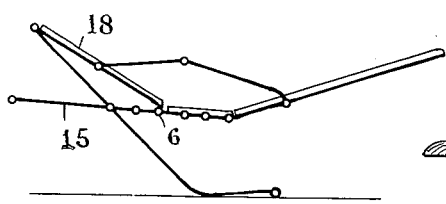
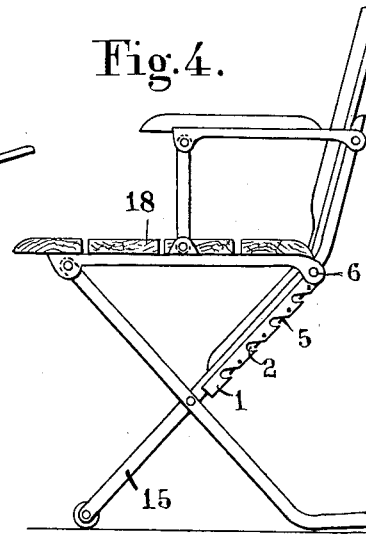
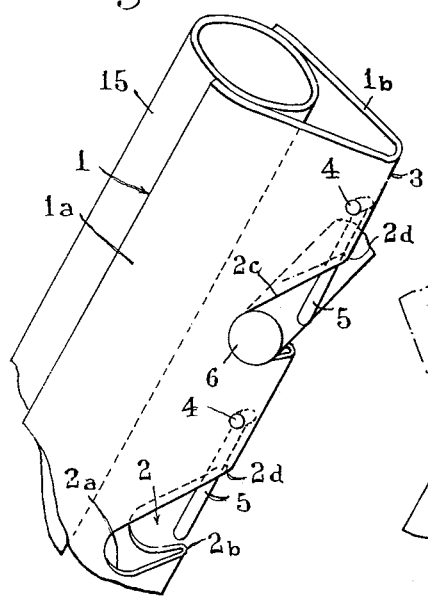
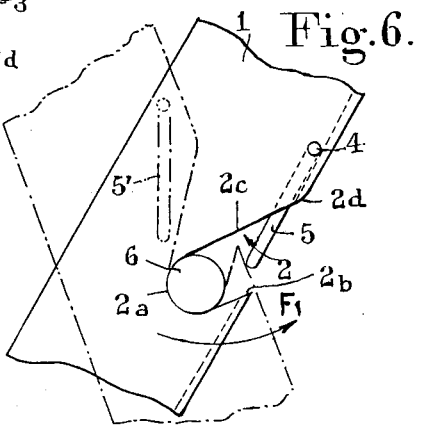

Aug. 6, 1963 H. CRESCENT 3,100,125
SAFETY LOCK MECHANISM, NOTABLY FOR CONVERTIBLE SEATS
Filed March 14, 1961 2 Sheets-Sheet 2

United States Patent Office 3,100,125
Patented Aug. 6, 1963

3,100,125
SAFETY LOCK MECHANISM, NOTABLY FOR CONVERTIBLE SEATS
Henri Crescent, 3 Rte. de Dieppe,
Arques-la-Bataille, France
Filed Mar. 14, 1961, Ser. No. 95,676
Claims priority, application France Mar. 14, 1960
3 Claims. (Cl. 297—26)

This invention relates to a safety device for automatically locking in different positions notably convertible seats or the like which comprise essentially a seat proper, X-shaped legs and a back or squab supported by the upper extensions of the front legs. This invention also relates to seats provided with the aforesaid device.

In pieces of furniture of the type set forth hereinabove the seat proper has its front edge pivotally mounted on the upper ends of the rear legs, and its rear edge may be locked at a desired height corresponding to selected positions of the seat which may be the table seat position, the living-room seat position, the relax position, etc.

The desired characteristics of locking devices for seats of this general character are their simplicity and sturdiness, together with reliability and automatic operation.

The device of this invention meets all these requirements in a highly satisfactory manner.

The operation of the device constituting the subject-matter of this invention is based on the fact that when the seat is used its weight plus the weight of the user provide the greater part of the stability of the locking means, but it is necessary to maintain this locked condition during the seat movements, more particularly when the seat is occupied.

On the other hand, the device of this invention provides an automatic locking action during very simple operations for changing the seat position, these operations consisting essentially in that the seat is tilted forwards until its front legs, carrying the aforesaid locking means, move beyond the vertical, and the seat proper—which is thus unlocked automatically—is placed in the desired position.

The device constituting the subject-matter of this invention consists essentially of a catch or pawl associated with locking means comprising an element rigid with, or formed or machined integrally in each front leg and comprising a number of notches or apertures which corresponds to that of the desired positions of the seat. The aforesaid pawl pivotally mounted about an axis overlying each notch is so shaped as to prevent the pins or the ends of a rod rigid with the rear edge of the seat from escaping from the bottom of the notches or apertures where they are nested during the normal use of the seat; besides, when the seat is tilted forwards for changing its position, said pawls clear the openings or outlet passages of said notches and the pins can be extracted therefrom and engaged into another pair of aligned notches or apertures.

Having thus selected the seat position and restored the front legs to their oblique operative position, the pawls will again lock the openings of the aligned notches and the assembly is thus safely maintained in its locked condition.

Other objects and advantages will become apparent from the following description taken in conjunction with the accompanying drawing in which:

FIGURE 1 is a diagrammatic side elevational view showing the seat of this invention in the "table seat" position;

FIGURE 2 is a view similar to FIG. 1 but showing the seat during a change in position;

FIGURE 3 shows the same seat in the "relax" position;

FIGURE 4 shows the safety automatic locking device of this invention, mounted on a seat of the type illustrated in FIGS. 1 to 3;

FIGURE 5 is a perspective fragmentary view showing on a larger scale the locking device of the invention;

FIGURE 6 is a detail view showing the operation of the device;

Figure 7:
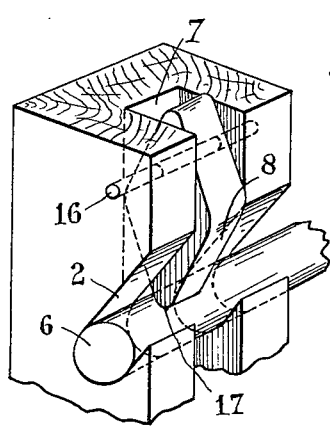
FIGURES 7 and 8 are a perspective view and a longitudinal section respectively showing a modified embodiment of the locking device of this invention.

Referring to the drawing, it will be seen that the locking device of this invention comprises essentially a section element such as 1 (FIGS. 4 and 5) formed with a number of spaced notches 2, this number corresponding to the number of positions in which the seat can be set and locked, and being at least equal to the last-named number.

The section element 1, according to one of the possible forms of embodiment of this invention, consists of a strip preferably of metal or other suitable material, for example plastic, which is bent along an axial longitudinal line 3. Notches 2 formed in the wings of section 1 across the edge 3 comprise a circular lower portion $2a$ a beak $2b$ connecting the bottom $2a$ to the edge 3. Above each notch 2 the ends of an horizontal trunnion 4 engage holes formed in the wings $1a$ and $1b$ of section element 1.

Each trunnion 4 carries a pivoting pawl 5. The length of this pawl 5 is such that when the seat is in one of its operative positions involving necessarily a backward inclination of the front legs 15, the pawl 5 engages automatically, by gravity, the inner face of edge 3, its lower end projecting beyond the upper end $2d$ of the notch opening to an extent sufficient to prevent the passage of the rear transverse rod 6 of the seat through said opening in the direction of the arrow F1. Of course, the dimensions of the notch opening, of the pawl and the diameter of the transverse rod 6 are selected to meet these requirements. In principle, the ends of the rod 6 forming pins are held in the bottom $2a$ of notches 2 in any operative position of the seat, when the front legs 15 thereof are inclined backwards, by the weight of the occupied seat which tends to divaricate the legs and presses the lower face of pins 6 into the bottom of the selected notch.

However, as this force is effective on only one direction, a seat movement by which a slight change in the position of the user may be attended could unlock the device, but this is prevented as shown in FIGS. 5 and 6 by the pawl 5, as in this case the distance between the free end of pawl 5 and the beak $2b$ of notch 2 is inferior to the diameter of pins 6. When it is desired to change the seat position the seat proper is tilted forwards in the direction of the arrow F (FIG. 2) by pulling the squab, so that the catch 5 is moved to a vertical position 5' (FIG. 6) in which it cannot prevent the movement of the rod 6 out from the notch 2.

Thus, as the distance between the end of pawl 5 and any point in the circular bottom $2a$ is greater than the diameter of pins 6, the latter may easily be extracted from the notch 2.

Figure 8:
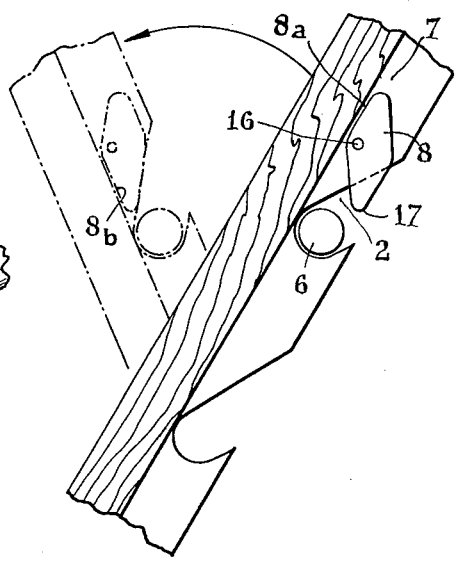
Figure 9:
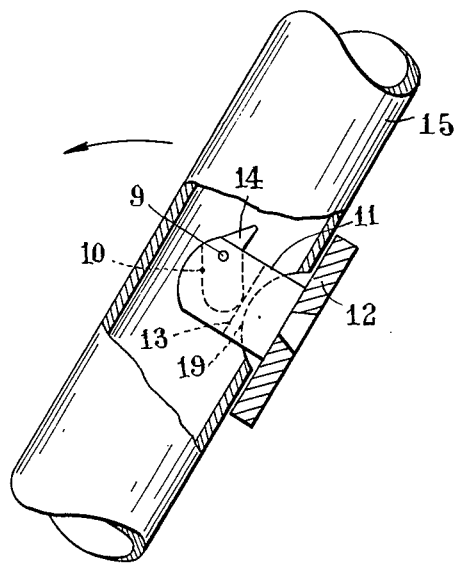
FIGURES 9 and 10 are a perspective view with parts broken away and a cross-sectional view respectively showing a modified embodiment of this invention.
Figure 10:
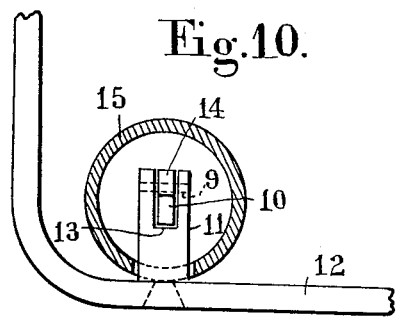

According to another modified embodiment (FIGS. 7 and 8) the section element 1 (which if desired may be rigid with the front legs) may consist of a material such as wood and be formed with a longitudinal mesial groove 7. In each groove 7 pawls 8 of lozenge configuration are suspended from transverse trunnions 16, as shown. Thus, when the front legs are inclined backwards the pawl 8 (which tends to remain suspended vertically by gravity) counteracts a possible thrust from pins 6 likely to move the point 17 of pawl 8 outwards. The resistance of the bottom of notch 7 engaged in this case by the upper inner edge 8a of the lozenge-shaped pawl 8 will thus prevent the point 17 from yielding. As the dimensions of this lozenge 8 are governed by the same requirements as those governing the dimensions of pawl 5, the pins 6 will remain locked in the notch.

When the front legs are inclined forwards (during a change of position) it is the side 8b of pawl 8 that engages the bottom of groove 7 and the passage for pins 6 is thus cleared.

According to another modified embodiment of this invention a pin 9 and catch 10 pivotally mounted on this pin are disposed in, and supported by, a lug 11. This lug 11 is secured on a bar 12 rigid with the rear portion of the seat proper (not shown). Formed centrally and longitudinally in the lug 11 is a central slot 13 having pivotally mounted therein on a pin 9 the pawl 10 provided with a beak 14. When the seat is in one of its operative positions, the front legs 15 are inclined to the rear and the lugs 11 engage openings 19 formed in these legs 15, each leg 15 being preferably of tubular configuration, the number of these openings 19 corresponding to that of the positions in which the seat may be set. The pawl 10 is shaped to lie in a substantially vertical position in this case and the beak 14 projecting above the contour of lug 11 prevents the latter from accidentally escaping from the corresponding opening 19.

When the front legs 15 are tilted forwards, the relative position of the lug 11 and pawl 10 is altered, the pawl remaining constantly in a substantially vertical position, the lug being either horizontal or inclined forwards. Thus, the beak 14 is retracted and the lug 11 can be retracted from the opening 16.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

What I claim is:

1. An automatic locking device notably for convertible chairs of the type consisting of a seat, an X-shaped leg system consisting of a pair of front legs and a pair of rear legs pivoted adjacent to their middle, wherein the upper ends of the rear legs are pivoted on the front portion of the seat, and a back solid and co-extensive with the front legs, notches formed on the rear faces of the upper portions of said front legs, and a pair of pins rigid with the rear portion of the seat proper and each adapted to be introduced into one of said notches of one of said front legs according to the desired height and inclination of the chair, said device comprising horizontal trunnions mounted on the rear part of said front legs, pawls pivotally supported by said horizontal trunnions and co-operating with said pins while operating by gravity only, said pawls being dimensioned and positioned for automatically locking said pins of the seat in said notches of said front legs by substantially blocking the passage of said pins through the notch apertures when the chair is in its operative position, that is, when said front legs are inclined backwards, and for automatically unblocking the passage of said pins through said notch apertures to permit the extraction of the pins therefrom when the front legs of said chair are tilted forwardly.

2. An automatic locking device notably for convertible chairs of the type consisting of a seat, an X-shaped leg system consisting of a pair of front legs and a pair of rear legs pivoted adjacent to their middle, wherein the upper ends of the rear legs are pivoted on the front portion of the seat, and a back solid and co-extensive with the front legs, an angle member clamping between its wings the rear portion of the upper portion of each front leg, the bottom of said angle member being formed with notches, a transverse rod at the rear portion of said seat and adapted to be introduced into selected ones of said notches of said angle members on said front legs according to the desired height and inclination of the chair, a horizontal trunnion extending between the wings of each said angle member and above each of said notches, pawls pivotally supported by said horizontal trunnions and co-operating with said rod while operating by gravity only, said pawls being dimensioned and positioned for automatically locking said rod in said notches in said angle members on said front legs by substantially blocking the passage of said pins through the notch apertures when the chair is in its operative position, that is, when said front legs are inclined backwards, and for automatically unblocking the passage of said pins through said notch apertures to permit the extraction of the rod therefrom when the front legs of said chair are tilted forwardly.

3. An automatic locking device according to claim 1, in which said upper portions of said front legs have a rearwardly opening U-shaped cross section, with said notches formed in opposite arms of said U-sections and with said trunnions extending between said arms above said notches.

References Cited in the file of this patent

UNITED STATES PATENTS

| 188,969 | Smith | Mar. 27, 1877 |
| 268,517 | Miller | Dec. 5, 1882 |
| 327,570 | Marston | Oct. 6, 1885 |
| 348,716 | Boggs et al. | Sept. 7, 1886 |
| 363,404 | Marston | May 24, 1887 |
| 1,351,146 | Zerlini | Aug. 31, 1920 |
| 1,913,651 | Yamaoka | June 13, 1933 |
| 2,692,719 | Maloney | Oct. 26, 1954 |
| 2,808,975 | Palmquist | Oct. 8, 1957 |
| 2,897,013 | Delp | July 28, 1959 |

FOREIGN PATENTS

| 13,596 | Great Britain | 1908 |
| 26,643 | Great Britain | 1913 |
| 159,599 | Great Britain | Feb. 28, 1921 |
| 129,834 | Switzerland | Jan. 2, 1929 |
| 818,553 | France | June 21, 1937 |
| 71,416 | Norway | Dec. 23, 1946 |
| 273,663 | Switzerland | May 16, 1951 |
| 702,707 | Great Britain | Jan. 20, 1954 |
| 1,187,224 | France | Mar. 2, 1959 |